United States Patent [19]

Kato et al.

[11] Patent Number: 5,177,564
[45] Date of Patent: Jan. 5, 1993

[54] APPARATUS FOR MEASURING THICKNESS OF PLATE-SHAPED ARTICLE

[75] Inventors: Kinya Kato; Kazuhiro Takaoka, both of Yokohama, Japan

[73] Assignee: Nikon Corporation, Tokyo, Japan

[21] Appl. No.: 806,298

[22] Filed: Dec. 13, 1991

[30] Foreign Application Priority Data

Dec. 21, 1990 [JP] Japan .................. 2-404890

[51] Int. Cl.⁵ .................. G01B 11/06; G01N 21/86
[52] U.S. Cl. .................. 356/381; 356/382; 356/384; 356/385; 356/239; 250/560
[58] Field of Search .................. 356/381–387, 356/128, 239, 240; 250/560

[56] References Cited

U.S. PATENT DOCUMENTS

| 3,743,428 | 7/1973 | Brown | 250/560 |
| 4,007,992 | 2/1977 | Petrohilos et al. | 356/387 |
| 4,634,281 | 1/1987 | Eikmeyer | 356/239 |

FOREIGN PATENT DOCUMENTS 0210705 10/1985 Japan .................. 356/381

Primary Examiner—Richard A. Rosenberger
Assistant Examiner—Hoa Q. Pham
Attorney, Agent, or Firm—Shapiro and Shapiro

[57] ABSTRACT

An apparatus for measuring the thickness of a plate-shaped article with a substantially rectangular lateral face, comprises a measuring optical system including a light-emitting unit for emitting a measuring light beam along an optical axis in a predetermined plane, and a light-receiving unit provided on said optical axis and adapted to generate an output signal corresponding to the amount of detected measuring light, support system for supporting the article in such a manner that the article is substantially parallel to the predetermined plane and the measuring light enters obliquely the lateral face of the article, relative movement unit for moving, in a direction crossing said predetermined plane, either of said article and the measuring light relative to the other, and determination unit for determining the thickness of the article, based on the output signal of the measuring optical system and the amount of movement by the relative movement unit.

6 Claims, 4 Drawing Sheets

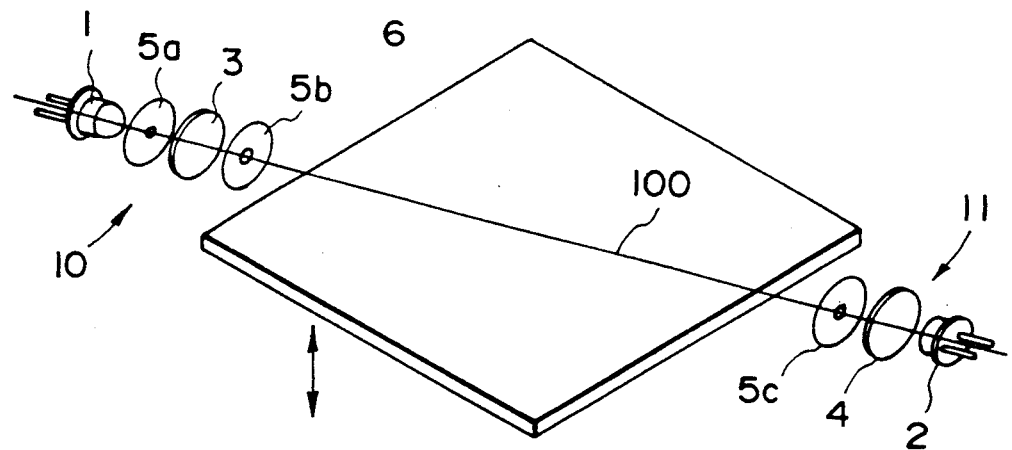
F I G. 1
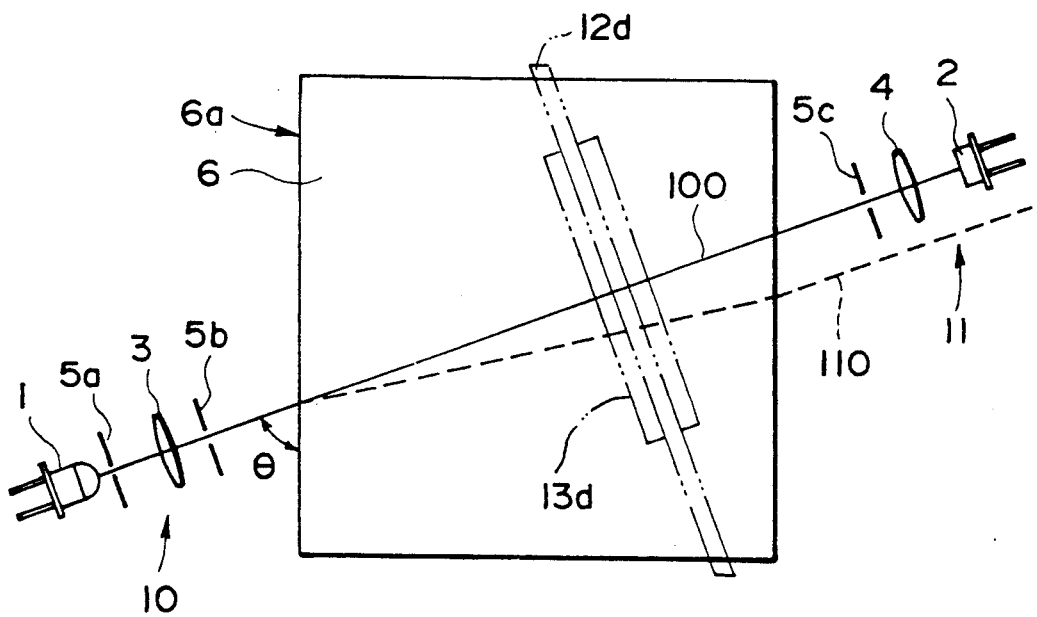
F I G. 2
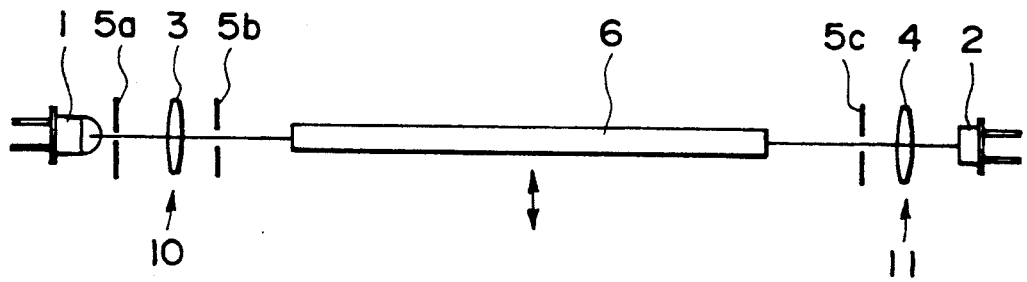
F I G. 3

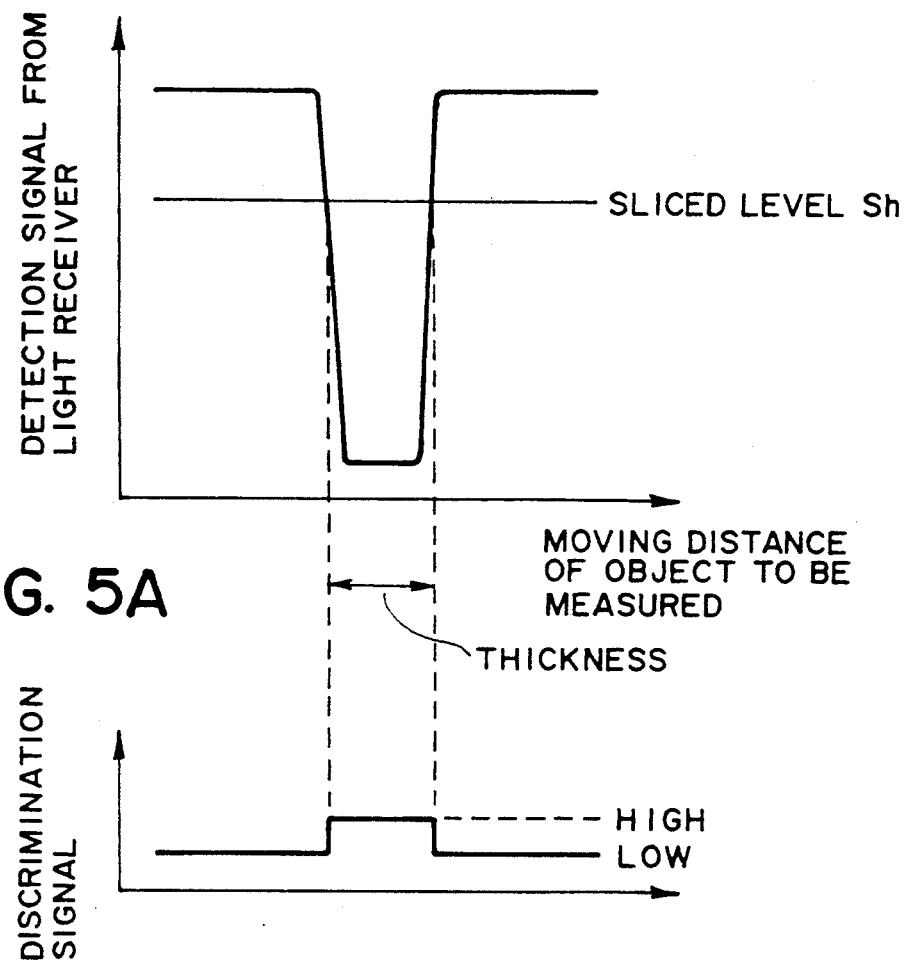
FIG. 5A
FIG. 5B
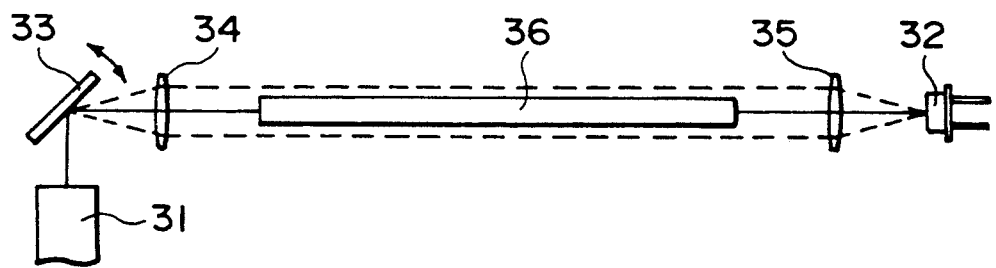
FIG. 6

APPARATUS FOR MEASURING THICKNESS OF PLATE-SHAPED ARTICLE

BACKGROUND OF THE INVENTION

1. Field of the Invention

The present invention relates to an apparatus for measuring the thickness of a plate-shaped article with a substantially rectangular lateral face.

2. Related Background Art

There is already known apparatus for measuring the thickness of an article, by moving said article in the direction of thickness thereof with respect to a measuring light emitted from a light emitting unit, and determining said thickness based on a signal from a photoreceptor positioned opposite to said light emitting unit and the amount of movement of said article. In such apparatus, said photoreceptor releases a signal showing different values according to whether the measuring light is intercepted or not by said article, and said apparatus measures the thickness of said article based on said signal and the amount of movement of said article.

However, such conventional thickness measuring apparatus may become incapable of accurate thickness measurement in case the article is composed of a translucent material such as a glass plate, since the measuring optical system and the article are so arranged that the lateral face of the article is perpendicular to the measuring light from the light emitting unit. In case of measuring the thickness of a translucent article, particularly having a flat lateral face, the output signal of the photoreceptor of said thickness measuring apparatus assumes a form as shown in FIGS. 7A and 7B. More specifically, said output signal, proportional to the amount of measuring light received by said photoreceptor, shows two bottoms B1, B2 because of the attenuation of the measuring light by scattering at both edges of the lateral face of the translucent article, and also shows a peak P since the measuring light is transmitted by said translucent article, almost without scattering in the non-edge part of the lateral face, and reaches the photoreceptor. If the thickness of the article is determined from the binary signal obtained by binary digitizing said output signal with a suitable slice level, there are erroneously given two thicknesses smaller than the actual thickness of the article. For this reason, the conventional thickness measuring apparatus has been incapable of accurate measurement of the thickness of a translucent article.

SUMMARY OF THE INVENTION

In consideration of the foregoing, the object of the present invention is to provide an apparatus capable of accurately measuring the thickness of a translucent article, without erroneous detection. The thickness measuring apparatus of the present invention comprises support means for supporting the article parallel to a predetermined plane, in such a manner that the lateral face of said article is positioned obliquely to a measuring light emitted from a light emitting unit along an optical axis lying in said plane.

Because of the presence of said support means in the thickness measuring apparatus, the measuring light from the light unit, when not coming across the article, proceeds along said optical axis and is detected by the photoreceptor. Upon coming across the article, said measuring light is not detected by the photodetector, as will be detailedly explained in the following.

In the measurement of the thickness of an opaque article, the measuring light, when intercepted by said article, is reflected or absorbed or scattered by said article and does not reach the photoreceptor. On the other hand, in the measurement of the thickness of a transparent article, when said measuring light is intercepted by an edge of the lateral face of said transparent article, said light is scattered by said edge and the amount of the measuring light received by the photoreceptor decreases significantly. When said measuring light is intercepted by a non-edge part of the lateral face of said transparent article, the measuring light is transmitted through said transparent article, with refraction into a direction out of the predetermined optical axis of the measuring light. Said measuring light is refracted again, upon emerging from said article, into a direction parallel to said optical axis. Thus refracted measuring light, being shifted from the optical axis by a certain distance, is therefore out of the light-receiving area of the photoreceptor and is thus not detected by said photoreceptor. Consequently, as shown in FIG. 5, the output signal of said photoreceptor shows a lowered intensity when the article intercepts the measuring light. Thus the thickness measuring apparatus of the present invention can detect the presence of the article regardless whether it is transparent or opaque.

The thickness measuring apparatus of the present invention, utilizing its ability to accurately detect the presence or absence of the article, measures the thickness of a translucent article in the following manner. Said thickness measuring apparatus causes a relative movement of the measuring light from the light emitting unit and said support means supporting the article by means of relative movement means to be explained in the following embodiment, then measures the amount of relative movement of said measuring light and said article while said article intercepts the measuring light, and determines the thickness of said article from said amount of relative movement.

The thickness measuring apparatus of the present invention, being capable of measuring the thickness of the article regardless of the light transmission characteristics thereof, is effective for measuring the thickness of a translucent substance, particularly a plate-shaped translucent article with a flat lateral face.

BRIEF DESCRIPTION OF THE DRAWINGS

FIG. 1 is a schematic perspective view of a principal part of a thickness measuring apparatus embodying the present invention;

FIG. 2 is a plan view of the apparatus shown in FIG. 1;

FIG. 3 is an elevation view of the apparatus shown in FIG. 1;

FIG. 5A is a chart showing the output signal of a photoreceptor of said embodiment;

FIG. 5B is a chart showing a discrimination signal obtained from a wave form processing circuit;

FIG. 6 is a frontal cross-sectional view showing the structure of the principal part of a variation of the thickness measuring apparatus;

DESCRIPTION OF THE PREFERRED EMBODIMENTS

Figure 4:
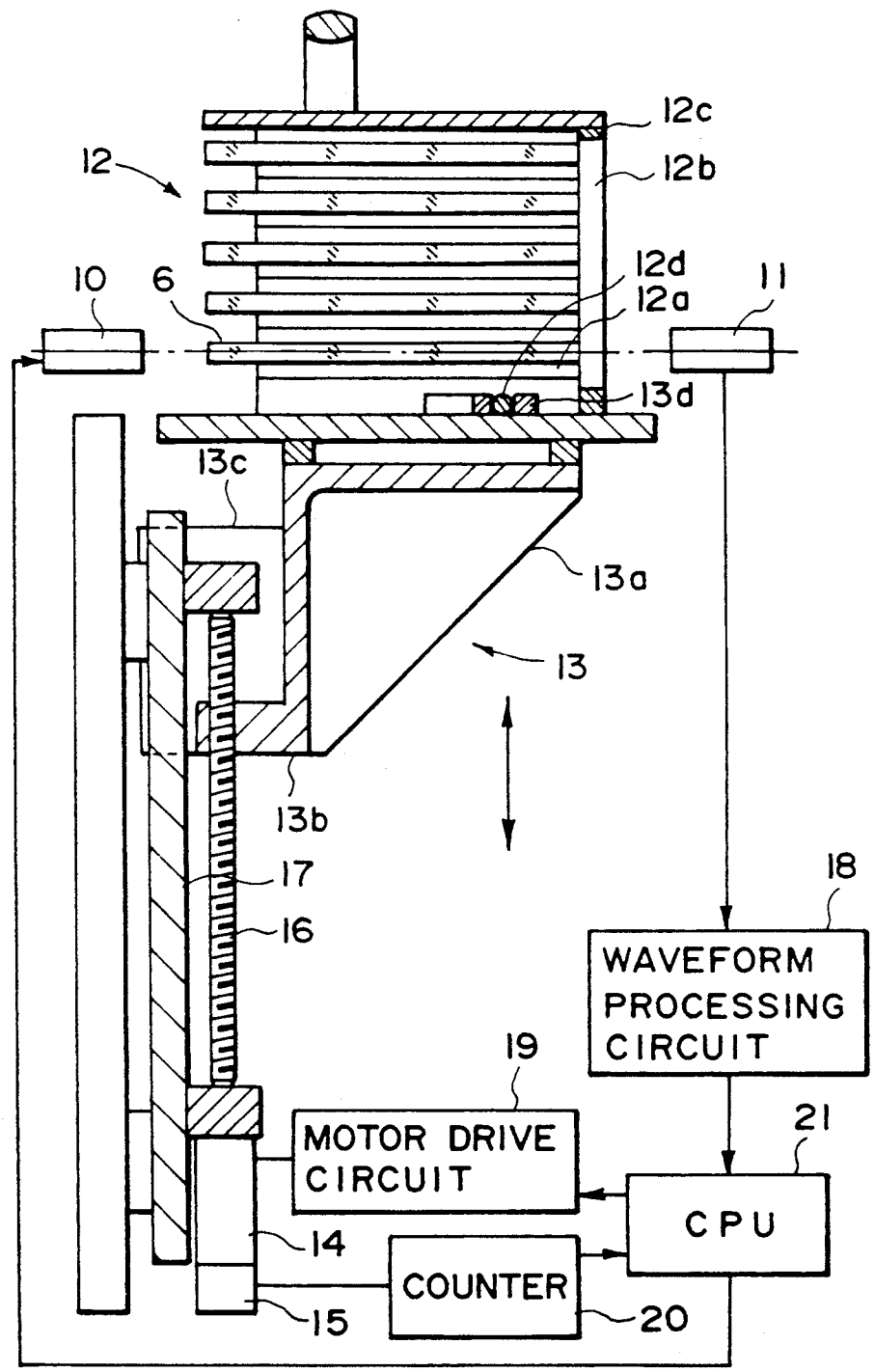
FIG. 4 is a partial cross-sectional view of the structure of the thickness measuring apparatus embodying the present invention.
Figure 7A:
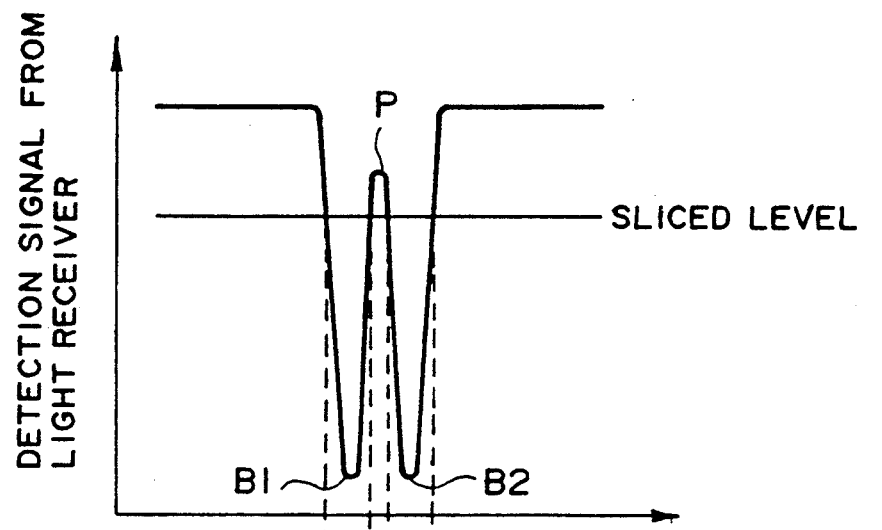
FIG. 7A is a chart showing the output signal of a photoreceptor in a conventional thickness measuring apparatus.
Figure 7B:
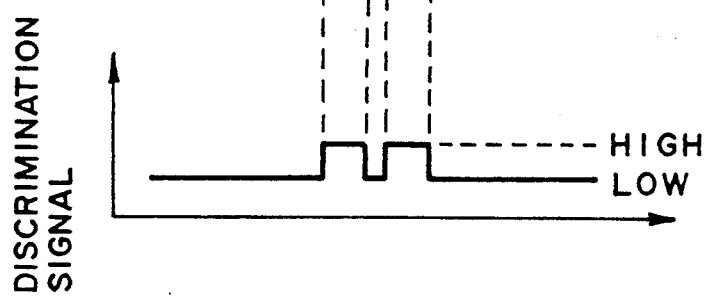
FIG. 7B is a chart showing the discrimination signal obtained from a wave form processing circuit in a conventional thickness measuring apparatus.

In a thickness measuring apparatus embodying the present invention, the principal part is constructed as shown in FIGS. 1 to 3. Said apparatus is designed for measuring the thickness of so-called reticle, consisting of a glass plate with a substantially rectangular lateral face and bearing thereon a circuit pattern used for example for the manufacture of a semiconductor device.

As shown in FIG. 1, the measuring optical system of said thickness measuring apparatus consists of a light-emitting unit 10 and a light-receiving unit 11, which are mutually opposed across a reticle 6. The light-emitting unit 10 is composed of a light-emitting diode (LED) 1, a pinhole plate 5a, a collimating lens 3, and a pinhole plate 5b, and emits a parallel measuring light beam of a small diameter along an optical axis 100 lying in a horizontal plane. The light-receiving unit 11 is composed of a pinhole plate 5c, a condensing lens 4, and a photoreceptor (photoelectric converting device) 2, which releases an output signal corresponding to the amount of received measuring light. The reticle 6 is supported, as shown in FIG. 2, by support means to be detailedly explained later, in such a manner that the optical axis 100 of the measuring light forms an angle $\theta$ of 70° with a lateral face 6a of the reticle.

In the above-explained thickness measuring apparatus, when the reticle 6 is vertically moved with respect to the measuring light as shown in FIG. 3, the measuring light is scattered by an edge of a lateral face of the reticle 6 when said measuring light passes through the vicinity of said edge, or, in the interior of the edge, proceeds along an optical axis 110 indicated by a broken line in FIG. 2. Thus, when the measuring light comes across said article, it does not reach the light-receiving unit 11, which therefore generates an output signal showing different intensities according to whether the measuring light comes across the reticle 6, as shown in FIG. 5A. Said thickness measuring apparatus for the reticle determines the thickness of the reticle 6, by detecting the amount of movement of the reticle 6 with respect to the measuring light, while the light-receiving unit 11 detects the reticle 6.

More specifically, the thickness measuring apparatus for the reticle is constructed as shown in FIG. 4. The measuring optical system is composed of the light-emitting unit 10 and the light-receiving unit 11, and the reticle 6 and the optical axis of the measuring light form an angle of 70° as explained before.

The aforementioned support means is composed of a cassette 12 and a cassette table 13. Said cassette 12 is provided with plural shelves 12a, a penetrating hole 12b, and a connecting rod 12d for connecting paired lateral plates at the right and at the left. Said plural shelves 12a are provided, inside the paired lateral plates of the cassette 12, at a constant interval in the vertical direction (direction of thickness of the reticle 6), and in pairs at left and at right. Said penetrating hole 12b is formed on a rear plate 12c of the cassette 12 sufficiently long in the vertical direction, so as not to hinder said measuring light. Each reticle 6 is supported at both lower sides by said shelf 12b. The position of the cassette 12 is fixed on the cassette table 13, by engagement of said connecting rod 12d with a projection 13d formed on the cassette table 13. Said connecting rod 12d is formed with an angle of 70° on the lateral plate of the cassette as indicated by chain lines in FIG. 2, and said projection 13d is formed on said cassette table 13 so as to be perpendicular to the optical axis 100 of said measuring optical system. Consequently the optical axis 100 of the measuring optical system forms an angle of 70° with respect to the lateral face of the reticle 6.

Said cassette table 13 is provided with a support member 13a bearing a nut 13b, a pair of guide connection members 13c, and the above-mentioned projection 13d. Said nut 13b engages with a feed screw 16. Said paired guide connection members 13c are formed outside said nut 13b, and pinch a guide member 17 from both sides. Said guide member 17 is provided with guide faces on both sides. The feed screw 16 is connected to the driving shaft of a motor 14, which is connected to a motor driving circuit 19 and is controlled by said circuit. Thus said cassette table 13 moves vertically along the guide member 17, by vertical movement of the nut 13b through rotation of the feed screw 16.

A CPU 21 is connected to the light-emitting unit 10, a wave form processing circuit 18, a motor driving circuit 19 and a counter 20. The CPU 21 receives the output signals from the wave form processing circuit 18 and the counter 20. Said wave form processing circuit 18 binary digitizes the output signal from said photoreceptor 2 utilizing a slice level Sh as shown in FIGS. 5A and 5B, and sends a binary discrimination signal, assuming high and low levels, to the CPU 21. Said counter 20 counts the signals from an encoder 15 connected to the motor 14, and generates a count signal corresponding to the amount of rotation of the motor 14.

In the above-explained thickness measuring apparatus, the thickness of the reticle 6 is determined in the following manner. The cassette 12, containing several reticles 6, is placed on the cassette table 13, which is in an upper or lower predetermined stand-by position. When the cassette 12 is placed, the motor 14 is rotated to move the cassette table 13, thereby scanning the cassette 12 from the top to the bottom thereof, or from the bottom to the top thereof. At the same time the CPU 21 reads the discrimination signal from the wave form processing circuit 18 and the count signal from the counter 20, and effects a conversion process for the number of the reticles 6 utilizing said signals. Said conversion process is to convert the change of the count signal during the low-level state of the discrimination signal into the amount of movement of the cassette table 13. The CPU 21 determines said amount of movement of the cassette table 13 as the thickness of each reticle.

The thickness of the reticle 6 is thus measured by the thickness measuring apparatus.

In the thickness measuring apparatus of the present embodiment, the relative movement of the optical axis 100 of the measuring optical system and the reticle 6 in the cassette 12 is achieved by the vertical movement of said reticle or the article, but the measuring optical system may be vertically moved as shown in FIG. 6. The measuring optical system in this case is composed of a light-emitting unit 31, a scanning mirror 33, a scanning lens 34, a condenser lens 35, and a photoreceptor 32. In this measuring optical system, the measuring light from the light-emitting unit 31 is put into scanning motion by the scanning mirror 33 such as a galvano mirror, and is made parallel to the optical axis by the scanning lens 34, whereby the measuring light is moved vertically. Then said measuring light is condensed by the condenser lens 35, and is received by the photoreceptor 32. The thickness measuring apparatus utilizing the above-explained measuring optical system measures the thickness by detecting the rotation angle of said scanning mirror while the reticle 6 intercepts the measuring light from said optical system, and converts said rotation angle into the amount of movement of the measuring light.

The angle $\theta$ between the lateral face of the article and the optical axis of the measuring light, selected as 70° in the foregoing embodiment, has to be so selected that the measuring light is now detected by the light receiving unit when said light enters the translucent article. The optimum value of said angle $\theta$ varies according to the distance by which the measuring light is to be shifted. Said distance depends on the diameter of the measuring light and the diameter of the light-receiving area of the photoreceptor. Said diameters are determined by the size of the pinhole of the pinhole plate to be placed in front of the photoreceptor in the present embodiment. Since the distance of shift of the measuring light is limited, the diameter of the measuring light and the light-receiving area of the photoreceptor are preferably selected smaller. Once the diameter of the measuring light and the light-receiving area of the photoreceptor are determined, the distance by which the measuring light has to be shifted can be determined. For inducing such shift, the distance of shift of the measuring light can be determined by the refractive index of the translucent article, the distance of transmission through the article, and the angle between the optical axis of the measuring light and the lateral face of the article. Consequently, if the refractive index and the size (distance of transmission) of the article are given as in the case of reticle in the present embodiment, the distance of shift of the measuring light depends on said angle $\theta$, which can be experimentally or theoretically selected in advance.

Thus, in the reticle thickness measuring apparatus of the present embodiment, the angle $\theta$ between the optical axis of the measuring light and the lateral face of the article, selected as 70° by mounting the connecting rod 12d of the cassette 12 at an angle of 70°, can be easily varied by a change in the mounting angle of said connecting rod 12d. However, the change of said angle $\theta$ in the thickness measuring apparatus for the present invention is not limited to the variation in the mounting angle of said connecting rod, but may also be achieved, for example, by a variation in the mounting angle of the projection 13d on the cassette table 13, or by a rotation of the cassette table 13 by means of a rotating mechanism provided thereto. Said rotating mechanism may be so designed to rotate the cassette table 13 about the approximate center thereof, as in the $\theta$-table for rotating the semiconductor wafer in the stepper.

Furthermore, said angle $\theta$ between the optical axis of the measuring light and the lateral face of the article can be set not only by the mounting angle of said connecting rod 12d but also by setting of a lateral face of the cassette table 13, parallel to the lateral face of the article, obliquely to the optical axis 100 of the measuring light. In such case, said connecting rod 12d is positioned parallel to the lateral face of the article, and said projection 13d is positioned obliquely to the optical axis of said measuring light, whereby the lateral face of the article forms the angle $\theta$ to said optical axis. Said angle $\theta$ may be varied by a variation in the angle between the projection 13d on the cassette table 13 and the optical axis 100, or by a variation in the mounting angle of the connecting rod 12d.

What is claimed is:

1. An apparatus for measuring the thickness of a plate-shaped article with a substantially rectangular lateral face, comprising:
    a measuring optical system including a light-emitting unit for emitting a measuring light beam along an optical axis in a predetermined plane, and a light-receiving unit provided on said optical axis and adapted to generate an output signal corresponding to the amount of detected measuring light;
    support means for supporting said article in such a manner that said article is substantially parallel to said predetermined plane and said measuring light enters obliquely the lateral face of said article;
    relative movement means for moving, in a direction crossing said predetermined plane, either of said article and said measuring light relative to the other; and
    determination means for determining the thickness of said article, based on the output signal of said measuring optical system and the amount of movement by said relative movement means.

2. An apparatus according to claim 1, wherein said oblique direction is so selected that said measuring light does not enter said light-receiving unit after being deflected by refraction by said article.

3. An apparatus according to claim 2, wherein said support means includes a cassette for supporting said article, a cassette table for supporting said cassette, and position determination means provided between said cassette and said cassette table.

4. An apparatus according to claim 1, wherein said relative movement means includes means for moving said article in said crossing direction, by moving said support means in said crossing direction.

5. An apparatus according to claim 1, wherein said relative movement means includes an optical system for moving said measuring light in a direction perpendicular to the optical axis in said predetermined plane.

6. An apparatus according to claim 5, wherein said relative movement means includes a scanning mirror for deflecting the measuring light from said light-emitting unit into scanning motion in a direction crossing said predetermined plane, an optical system for shifting the light put into scanning motion by said scanning mirror into a direction substantially parallel to said predetermined plane, and an optical member for condensing said parallel scanning light toward the light-receiving unit.

* * * * *